April 30, 1968 J. R. SPENCE 3,380,216
TRAILER ENCLOSURE CONSTRUCTION
Filed Oct. 21, 1965
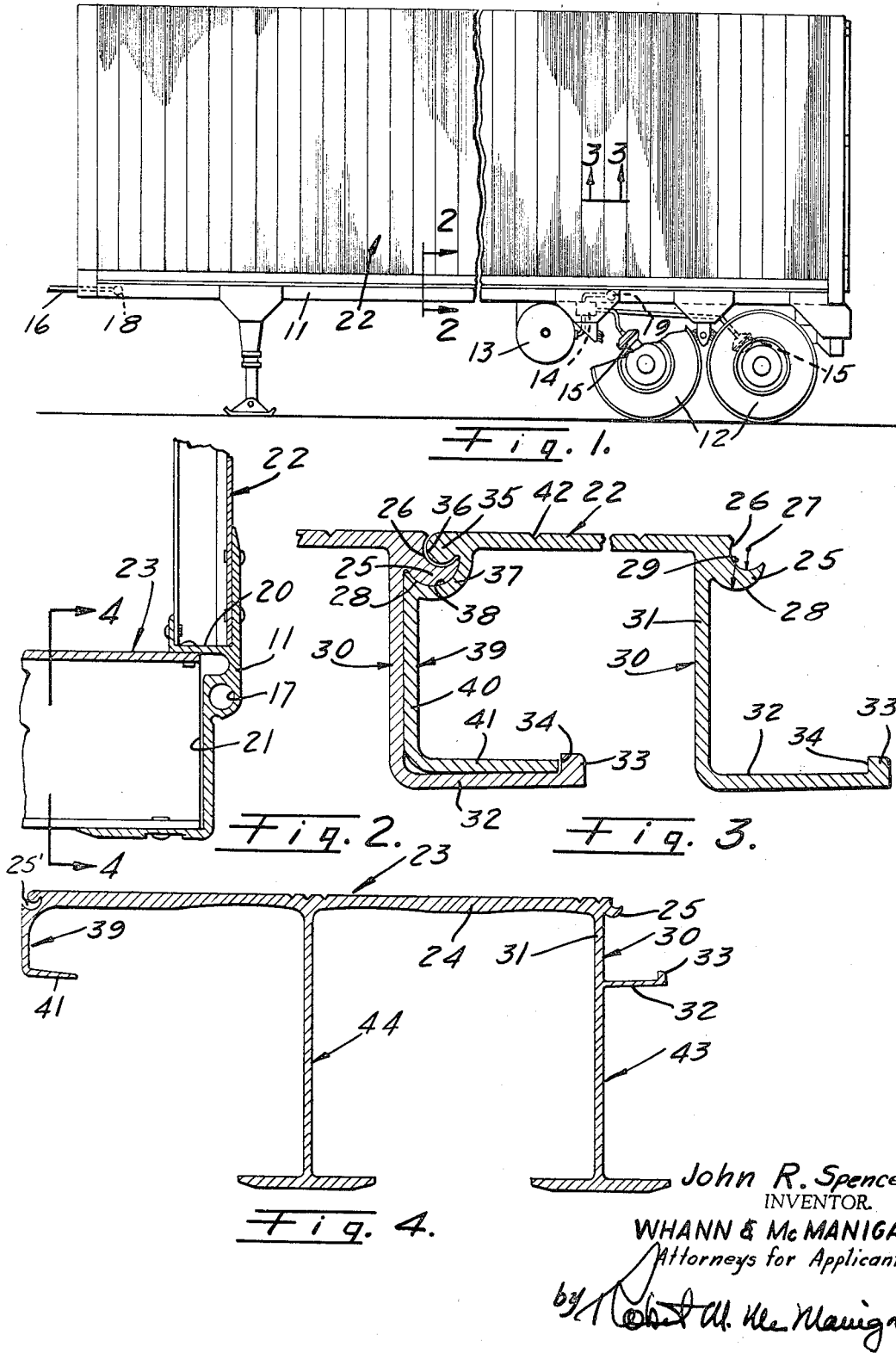
John R. Spence
INVENTOR.
WHANN & McMANIGAL
Attorneys for Applicant United States Patent Office 3,380,216
Patented Apr. 30, 1968

3,380,216
TRAILER ENCLOSURE CONSTRUCTION
John R. Spence, San Pedro, Calif., assignor to Pike Trailer Co., Los Angeles, Calif., a co-partnership
Filed Oct. 21, 1965, Ser. No. 500,421
6 Claims. (Cl. 52—595)

ABSTRACT OF THE DISCLOSURE

An interlocking extruded modular panel section having a hook-shaped flange on one edge with a concave upper side formed by a semi-cylindrical longitudinally extending groove and a convex underside formed by an enlarged cylindrical surface in eccentric relation to the groove surface and cooperating therewith to taper the flange towards the hook point, an elongate angle portion with one leg extending from the base of the hook and its other leg extending in the general direction of the hook and having an upturned end; a flange on the opposite edge margin of the panel formed by a circular beaded edge portion having a surface complementary to that of the other edge groove, and an elongate groove subtending the beaded edge having surfaces complementary to those of the hook-shaped flange, and an elongate angle portion extending from the underside of the subtending groove adapted to nest with the other edge angle portion of an adjacent connected panel section and interlock behind the upturned end thereof, whereby adjacent panels can be edge connected by a double interlock which will be increasingly more tightly wedged as load forces are increased.

---

The present invention relates generally to enclosure structures; and is more particularly concerned with extruded module sections of the interlocking type and which are especially advantageous for trailer floors, side walls, roof structures, and the like.

While the modules will be described herein with particular reference to their use for trailer enclosure structures, the invention is not to be thus limited, since the modules have general application in other fields.

Conventional trailer floor structures consist of various arrangements of joists, sills, stringers, floor boards and various types of fasteners, these parts being ordinarily made of steel, aluminum, wood, or a combination of these materials. Such structures are extremely costly and involve the spacing, fitting, splicing, drilling, fastening, storing, cutting, clamping, and all the tools required to perform such operations.

In the case of aluminum van trailer constructions, conventional arrangements consist of smooth or corrugated aluminum sheets supported by stiffeners attached with fasteners that must resist all the loads such as torsion, tensions, compression, bending, horizontal and vertical shear which may result therein. Said structures require the use of a large variety of tools, such as drills, bits, clamps, bucking bars, rivet sets, rivet guns, corrugators, shears, etc., all of which result in extremely expensive operation procedures.

Having in mind the inherent disadvantages with respect to presently used procedures and materials, the present invention has for one object the provision of improved extruded modular panel sections which can be quickly and easily assembled by improved interlocking means and integrally formed parts which snap-interlock the panels in assembled relation, such features enabling the construction of modules which may be utilized for flooring, partitions, walls, doors, racks, and the like for truck trailers, shipping compartments, railroad and air cargo structures.

A further object is to provide improved extruded modules in the form of interlocking panel sections which incorporate integral stiffening and supporting portions, which can be assembled into interlocking relation in most cases without the use of tools, which present an exposed surface which is unblemished by exposed fasteners, lap joints, and the like, and which provide a clean, striking appearance and streamlined surface for reducing air drag in the case of trailer side wall structures.

A still further object is to provide interlocking extruded panel modules which are easily assembled, and which cannot be separated without deformation of the material or by sliding one module with respect to the other in the direction of its stiffeners.

Another object is to provide in interlocking panel modules, interlocking parts which provide a double interlock, and wherein the parts coact in such a manner that loads applied in a normal direction to the panels will operate to more forcefully interlock the panels and thus prevent springing apart of the interlocking parts and disconnection of the interconnected panels with respect to each other.

Another object of the invention is to provide in a trailer enclosure structure an improved side rail for supporting the floor and wall modules, and which embodies an extruded internal bore which provides a conduit for conducting brake actuating fluid from a source of supply to a point of use proximate to the braking means of the trailer. By this means, the conventional piping is eliminated. Conventional piping is a continual source of potential damage by debris thrown up from the highway by tires and wind, vibration, impact, abrasion, and the like, and constitutes a constant high cost maintenance item. By conducting the fluid through a bore in the side rail the fluid conduit is fully protected by being incorporated in one of the strongest members of the trailer structure.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a side elevational view of a trailer embodying the features of the present invention, parts being cut away to show certain details;

FIG. 2 is an enlarged fragmentary section taken substantially on line 2—2 of FIG. 1;

FIG. 3 is an enlarged fragmentary sectional view showing details of construction of wall panel modules embodying the present invention, taken substantially on line 3—3 of FIG. 1; and FIG. 4 is an enlarged sectional view showing details of construction of a floor module embodying the features of the present invention, taken substantially on line 4—4 of FIG. 2.

Referring generally to the drawings, for illustrative purposes, there is shown in FIG. 1 a trailer 10 of the van type, and which embodies the features of the herein described invention.

Briefly, the trailer comprises an underframing which includes a side rail 11 along each side, which form longitudinally extending beams or supports upon which the trailer body side walls and flooring may be directly mounted. Further, the side rails in association with other frame members, not shown, provide the frame structure from which the suspension system for ground wheels 12 is suspended. These wheels are provided with a fluid actuated braking system which includes the usual combination of an air reservoir or tank 13, control valve 14 which feeds actuating fluid to appropriate brake actuators 15 from a suitable source of pressurized fluid supply. The fluid supply is usually from a compressor (not shown) mounted on the truck with which the trailer is associated, supply line or lines 16 being usually connected from the truck to the trailer.

In the present invention, instead of utilizing the usual exposed piping on the under side of the trailer frame structure where it is subject to possible damage and entails high maintenance cost, the side rail 11 which constitutes a part of the enclosure structure is utilized as a fluid conveyance means. For such purpose, the side rail is fabricated as an extrusion which embodies a longitudinally extending internal bore channel 17 which may be closed by appropriate means at the ends of the side rail. This bore provides a conduit for conducting brake actuating fluid from a source of supply to the point of use proximate to the braking means. The supply line 16 is disclosed as having a connection 18 at the forward end of the trailer with the bore channel, and the bore channel has a connection 19 at the fluid delivery end for the adjacent braking system.

The elongate side rail 11 is fabricated to provide an upper elongate U-shaped channel portion 20 and a lower inwardly opening U-shaped channel portion 21 in right-angled relation to the upper channel portion. These channel portions serve as supports for the side wall forming modules, as generally indicated at 22, and the floor forming modules, as generally indicated at 23.

The wall module 22 and floor module 23 are of similar construction in that they comprise elongate panel section forming extrusions which are preferably constructed of a suitable light-weight workable metal, such as some of the available aluminum alloys. The modules are designed to have interlocking margin parts so that the panel sections may be interconnected in most cases without the use of tools. The modules also include integrally formed reinforcing portions, and as thus fabricated provide extruded panel sections which can be quickly and easily mounted in interlocked installed position to provide enclosure panel sections which resist all the material load forces applied to the structure, such as torsion, tensions, compression, bending, horizontal and vertical shear. Where the vertical shear becomes important, it is only necessary to secure the interconnected panel section with a shear rivet, spot-welding, or similar means, to prevent relative axial shifting of the module panel sections.

The side wall forming modules 22 will first be described. Such modules are illustrated in FIG. 3 and comprise an elongate panel body 24 which is shown as being generally of uniform thickness. The side margins of the module section are formed for interlocking connection with adjacent side margins of modules associated in side-by-side relation. For this purpose, the right edge margin, as shown in FIG. 3, is fabricated with a hook-shaped flange 25, which in section provides a tapered horn-like male member. The upper side of this flange has a concave surface formed by a semi-cylindrical groove 26 which is generated by a radius having a center of rotation at 27. The undersurface of the flange 25 is convex and transversely is formed by an enlarged cylindrical surface generated by a radius having a center of rotation at 29. It will therefore be evident that with the centers of rotation 27 and 29 in offset relation, the surfaces 26 and 28 will be eccentric and cooperate to provide in effect a curved wedge. Subtending from the base portion of the hooked flange is an integrally formed angle portion 30 having a first leg 31 which extends at right angles to the panel body 24, and a second leg 32 which extends in the same general direction as the hooked flange. The leg 32 is slightly upwardly inclined toward its outer end which carries an upturned end flange 33 having an inner shoulder 34.

Along the opposite side of the module there is provided an edge bead 35 of generally circular form and having a surface 36 which is complementary to that of the surface of groove 26. Extending from the inner side margin of the bead 35 is a curved wall 37 having an inner surface 38 which is complementary to the surface 28 of the hooked flange. The surfaces 36 and 38 coact to form a groove 25' which is in general complementary to the hook flange 25. Subtending this groove and extending from the wall 37 is an integral angle portion 39 composed of a first leg 40 in right angled relation to the panel body 24, and a second leg 41 extending in the general direction of the leg 32 of the angle portion 30. In this case, the leg 41 is slightly downwardly inclined, and the angle portion 39 in the assembled connected relation of adjacent module sections is adapted to nest with the angle portion 30 with the outer edge of the leg 41 seated behind the shoulder 34 of the leg 32. Due to the upward inclination of leg 32 and downward inclination of leg 41, these two legs will be in pressure engagement in interlocked relation.

Adjacent module sections are connectible by placing adjacent panels in an initial angular relation so that the edge bead 35 will be seated in the groove 26 and thus form a hinge connection. The adjacent sections are then hingedly swung to bring the panel bodies into the same plane. This action causes the hook-flange 25 to enter the groove 25' with a wedging action such that a double interlock is formed. As the connecting motion continues, the angle portions 30 and 39 of the connection are brought into a position where they will be pried apart by the engagement of the leg 41 with the upturned end flange 33 until the outer end of the leg 41 snaps over the edge flange and assumes a seated position behind the inner shoulder 34. A tight coupling is thus established between the connected panel modules which can only be broken by deformation of material or by sliding one module with respect to the other. Where the modules are installed under conditions where axial movement may occur between the angle portions, the angle portions may be spot-welded or provided with suitable rivets to take the shear forces. The connected panels with the interlocking connections as described above provide enclosure means which are particularly adapted to take torsion, tension and compression forces, and the double interlock upon the application of load forces in a direction normal to the panel bodies 24 will increasingly be forced into greater wedging engagement under the action of these forces. The nested angle portions 30 and 39 provide stiffeners for the connected modules. When utilized for the formation of side walls, for example, in a trailer-van-enclosure, the outer surfaces of the panel bodies may be striated with longitudinally extending V-grooves 42 which are spaced to give a pleasing esthetic effect to the appearance of the van surface.

Referring to FIG. 4, it will be observed that in general the floor-forming modules 23 are of the same construction with respect to the interlocking features as described in connection with the side wall forming modules 22. In the case of the floor module, the construction is modified by the provision of load-carrying inverted T-beams which are integrally formed with the module structure. Such supports may be formed at the interlocked joints between the adjacently connected modules by providing an inverted T-section 43 as a subtending extension of the leg 31. Other T-sections, as indicated at 44, may be provided between the marginal edges of the module, these sections being integrally formed and subtending from the panel body 24.

From the foregoing description and drawings, it will be clearly evident that the delineated objects of the invention will be accomplished.

Various modifications may suggest themselves to those skilled in the art without departing from the spirit of my invention, and, hence, I do not wish to be restricted to the specific forms shown or uses mentioned, except to the extent indicated in the appended claims.

I claim:

1. An extruded enclosure forming elongate module section having opposite edge configurations for interlocking engagement with companion configurations of adjacent connectable sections, comprising:

(a) an elongate panel;

(b) a hook-shaped flange extending along one edge margin of the panel, said flange having an elongate concave upper side formed by a semi-cylindrical groove extending lengthwise thereof, and a convex underside formed by an enlarged cylindrical surface in eccentric relation to the groove surface, whereby the flange tapers towards the hook point;

(c) an elongate integral angle portion having a first leg extending from the base of the hook flange in right angled relation to said panel and a second leg extending in the same general direction as the hook flange, said latter leg having an upturned edge flange;

(d) an elongate flange extending along the opposite edge margin of the panel having a circular beaded edge providing a surface complementary to that of said groove;

(e) an elongate groove subtending said beaded edge having surfaces complementary to those of the hook-shaped flange; and (f) an elongate integral angle portion having a first leg extending from the underside of said subtending groove in right angled relation to said panel, and a second leg extending in the direction of the second leg of said first angle portion, and being of a length to seat behind the upturned edge flange of an adjacently connected module section.

2. An extruded enclosure forming elongate module section having opposite edge configurations for interlocking engagement with companion configurations of adjacent connectable sections, comprising:

(a) an elongate panel;

(b) a hook-shaped flange extending along one edge margin of the panel, said flange having an elongate concave upper side formed by a semi-cylindrical groove extending lengthwise thereof, and a convex underside formed by an enlarged cylindrical surface in eccentric relation to the groove surface, whereby the flange tapers towards the hook point;

(c) an elongate integral angle portion having a first leg extending from the base of the hook flange in right angled relation to said panel and a second leg extending in the same general direction as the hook flange, said latter leg having an upturned edge flange;

(d) an elongate flange extending along the opposite edge margin of the panel having a circular beaded edge providing a surface complementary to that of said groove;

(e) an elongate inwardly tapered groove subtending said beaded edge having surfaces complementary to those of the hook-shaped flange; and (f) an elongate integral angle portion having a first leg extending from the underside of said subtending groove in right angled relation to said panel, and a second leg extending in the general direction of the second leg of said first angle portion, said second legs being arranged to make nested engagement when adjacent modules are internested, and at least one of said second legs being normally slightly inclined.

3. An extruded module section according to claim 1, comprising: an inverted T-section integrally formed with one of the elongate integral angle portions and providing a subtending extension of its first leg beyond its associated second leg.

4. An extruded module section according to claim 3, wherein an additional inverted integrally formed T-section subtends the elongate panel and is positioned between its opposite edge margins.

5. In an enclosure structure, a plurality of module panel sections connected in side-by-side relation, comprising:

(a) a first panel;

(b) a second panel;

(c) complementary interfitting parts carried by adjacent edge margins of said panels connecting the panels for relative pivotal swinging movement of the panels from an initial angular relationship to a final planar relationship in which the parts coact to form a double interlocked connection between the panels, said interfitting parts including eccentric sets of engaged curved surfaces coacting in the final planar relationship of the panels to be forceably wedged against separation and become wedged with increasing force as load forces are applied in a normal direction to said panels;

(d) integrally formed depending flange members respectively carried by said panels adapted for face engagement in the final planar relationship of the panels; and (e) means for holding said flange members in said face engagement.

6. In an enclosure structure, the combination of:

a plurality of extruded elongate module panel sections connected in side-by-side relation by complementary interfitting parts carried by adjacent edge margins of said panel sections, operative to connect the panel sections for relative pivotal swinging movement from an initial angular relationship to a final planar relationship in which the parts coact to form a double interlocked connection between the sections and in which the parts are forceably wedged against separation and become wedged with increasing force as load forces are applied in a normal direction to said panel sections; each of said sections comprising:

(a) an elongate panel;

(b) a hook-shaped flange extending along one edge margin of the panel, said flange having an elongate concave upper side formed by a semi-cylindrical groove extending lengthwise thereof, and a convex underside formed by an enlarged cylindrical surface in eccentric relation to said groove surface, whereby the flange tapers towards the hook point;

(c) an elongate integral flange leg portion extending from the base of the hook flange in right angled relation to said panel;

(d) an elongate flange extending along the opposite edge margin of the panel having a circular beaded edge providing a surface complementary to that of said groove;

(e) an elongate groove subtending said beaded edge having surfaces complementary to those of the hook-shaped flange;

(f) an elongate integral flange leg portion extending from the underside of said subtending groove in right angled relation to said panel, and adapted to make face engagement with the other flange leg portion of the adjacent section in said final planar relationship of the sections; and means for connecting together the engaged flange leg portions of the panel sections.

References Cited

UNITED STATES PATENTS

| | | | |
|---|---|---|---|
| 1,913,342 | 6/1933 | Schaffert | 105—422 |
| 2,228,411 | 1/1941 | Sheridan | 180—66 |
| 2,926,928 | 3/1960 | Bennett | 296—28 |
| 3,111,205 | 11/1963 | Gresham | 105—422 |
| 3,203,149 | 8/1965 | Soddy | 52—588 |
| 3,243,201 | 3/1966 | Bock | 296—28 |

BENJAMIN HERSH, *Primary Examiner.*

J. A. PEKAR, *Assistant Examiner.*